(12) United States Patent
Hibi

(10) Patent No.: US 6,647,606 B2
(45) Date of Patent: *Nov. 18, 2003

(54) JIG AND METHOD FOR ASSEMBLING TOROIDAL CONTINUOUSLY VARIABLE TRANSMISSION

(75) Inventor: Toshifumi Hibi, Yokosuka (JP)

(73) Assignee: Nissan Motor Co., Ltd., Yokohama (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 202 days.

(21) Appl. No.: 09/335,471

(22) Filed: Jun. 18, 1999

(65) Prior Publication Data

US 2001/0004793 A1 Jun. 28, 2001

(30) Foreign Application Priority Data

Jun. 23, 1998 (JP) ............................. 10-175751

(51) Int. Cl.⁷ .............................................. B25B 27/14
(52) U.S. Cl. ........................ 29/271; 29/281.5; 29/464; 411/386
(58) Field of Search ........................... 29/281.1, 281.5, 29/434, 464, 418, 423; 411/354, 386

(56) References Cited

U.S. PATENT DOCUMENTS

| 162,077 | A | * | 4/1875 | Kellogg |
|---|---|---|---|---|
| 1,109,094 | A | * | 9/1914 | Weckbaugh |
| 1,395,608 | A | * | 10/1921 | Davern |
| 2,292,102 | A | * | 8/1942 | Cluett |
| 3,110,095 | A | * | 11/1963 | Peickii |
| D201,401 | S | * | 6/1965 | Picot |
| 3,817,146 | A | * | 6/1974 | Scott |
| 3,979,994 | A | * | 9/1976 | Collignon |
| 4,005,629 | A | * | 2/1977 | Franklin |
| 4,033,380 | A | * | 7/1977 | Weber |
| 4,400,123 | A | * | 8/1983 | Dunegan |
| 4,525,915 | A | * | 7/1985 | Rich |
| 5,875,550 | A | * | 3/1999 | Kohn |

FOREIGN PATENT DOCUMENTS

| DE | 198 34 958 A1 | 2/1999 |
|---|---|---|
| JP | 11-51135 A | 2/1999 |

OTHER PUBLICATIONS

"Annex to the Simson Repair Book". Anhang Simson Reparaturbuch—Miraculis [online], 1999, [retrieved on Jan. 24, 2001]. Retrieved from the Internet <URL:http://www.imise–uni–leipzig.de/–18 med93dhj/aw/simson/text/rep/rep6.html>.

"Repair instructions for Simson vehicles". Reparaturanleitung für Simson–Fahrzeuge [online]. 1999, [retrieved on Jan. 24, 2001]. Retrieved from the Internet <URL: http://www.imise–uni–leipzig.de/~med93dhj/aw/simson/text/rep/rep.html>.

Schrader, H., "The engine M 53/1 KH with three–speed transmission, hand gear shift and kick starter". *KR51–Schwalbe 1964–1986*, (1998), pp. 27–37, 49, and 93. Published by Schrader Verlag, Germany.

* cited by examiner

*Primary Examiner*—Gregory Vidovich
*Assistant Examiner*—Eric Compton
(74) *Attorney, Agent, or Firm*—Foley & Lardner

(57) ABSTRACT

In an assembly of a toroidal continuously variable transmission, a sheath member (41) is temporarily fitted on a male screw (3A) so that a step between a spline part (21A) and a male screw (3A) of a CVT shaft (3) does not catch on an output disk (18, 20) when the CVT shaft (3) is passed through the output disk (18, 20). The outer diameter of the sheath member (41) is gradually reduced in a tapering shape from an outer diameter equal to that of the spline part (21A).

4 Claims, 4 Drawing Sheets

US 6,647,606 B2

JIG AND METHOD FOR ASSEMBLING TOROIDAL CONTINUOUSLY VARIABLE TRANSMISSION

FIELD OF THE INVENTION

This invention relates to a jig for use in assembling a toroidal continuously variable transmission.

BACKGROUND OF THE INVENTION

A toroidal type continuously variable transmission (toroidal CVT) transmits a rotation torque by power rollers gripped between an input disk and output disk, and achieves a desired speed ratio according to a gyration angle of the power rollers.

The input disk and the output disk rotate around a relatively long shaft member known as a CVT shaft. When the toroidal continuously variable transmission is assembled, an output disk is fitted in a housing. The CVT shaft penetrates a hole formed in the center of the output disk, and the input disk is then fitted to the CVT shaft.

In a "double cavity" CVT wherein two input disks and output disks are arranged on the same CVT shaft, the two output disks are first fitted to the housing. The CVT shaft to the base end of which one input disk is attached, is passed through the output disks, and the other input disk is fitted on the penetrating end.

SUMMARY OF THE INVENTION

As various members are fitted to the CVT shaft, the diameter of the CVT shaft is not uniform, and in some parts of the shaft, there are large diameter parts and small diameter parts separated by a step. When the CVT shaft is passed through the output disk and other members during assembly of the continuously variable transmission, these steps may catch in the holes of the parts which renders assembly of the CVT difficult.

It is therefore an object of this invention to facilitate the operation of passing the CVT shaft through the output disk which is required for assembly of the toroidal continuously variable transmission.

In order to achieve the above object, this invention provides a jig for passing an axial member of a continuously variable transmission through disks which have been prefitted in a housing, wherein the axial member has a step between a large diameter part and a small diameter part. The jig comprises a sheath member which fits on the outer circumference of the small diameter part adjacent to the step, the outer diameter of the sheath member gradually decreasing from an outer diameter equal to that of the large diameter part.

This invention also provides a method of assembling a toroidal continuously variable transmission that has an axial member passing through disks which have been prefitted in a housing, wherein the axial member has a step between a large diameter part and a small diameter part. The method comprises passing the axial member through the disks after fitting a sheath member having an outer diameter which gradually decreases from an outer diameter equal to that of the large diameter part onto the small diameter part of the member.

The details as well as other features and advantages of this invention are set forth in the remainder of the specification and are shown in the accompanying drawings.

DESCRIPTION OF THE PREFERRED EMBODIMENTS

Figure 1:
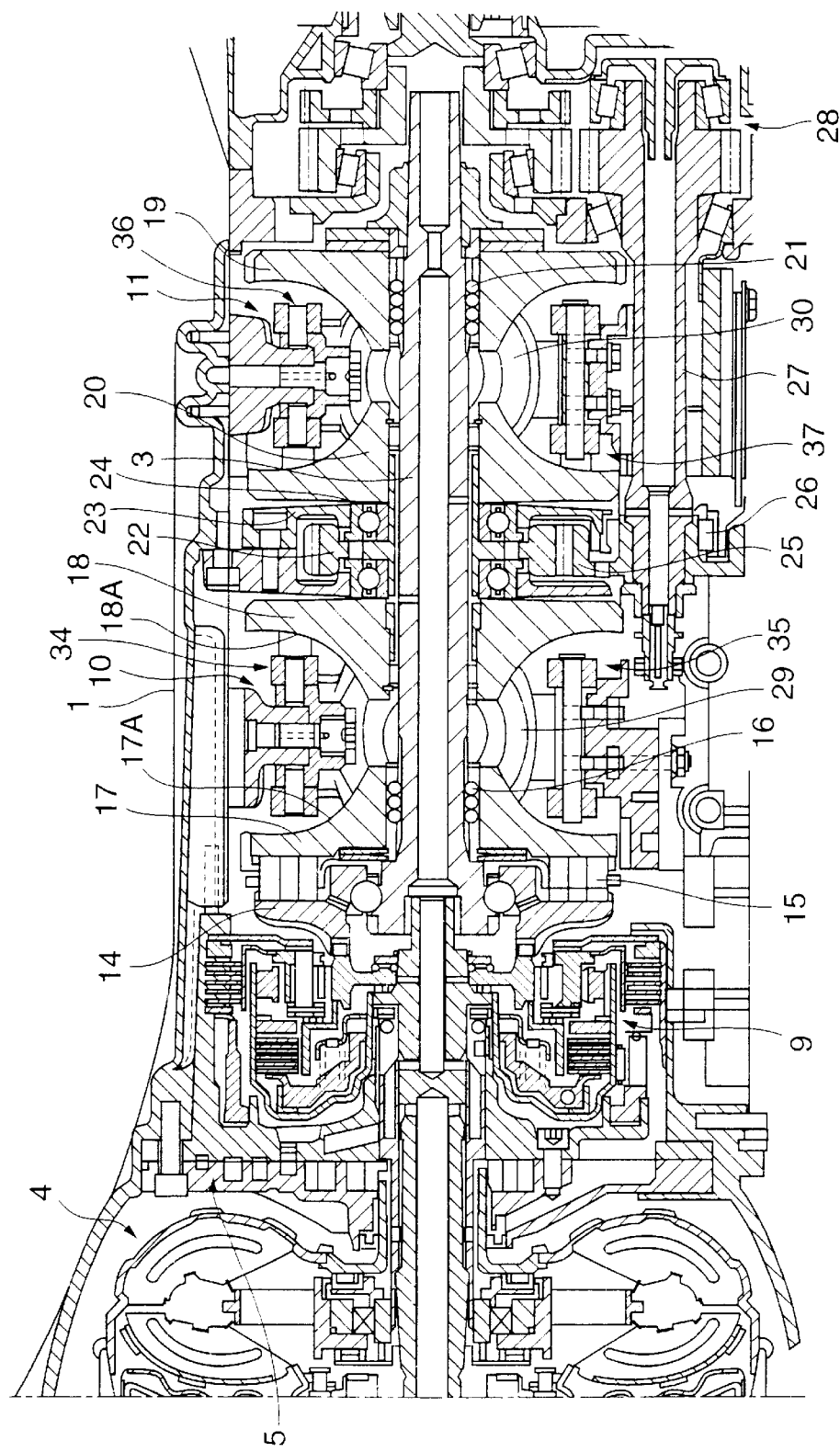
FIG. 1 is a longitudinal sectional view of a vehicle drive system comprising a toroidal continuously variable transmission.

Referring to FIG. 1 of the drawings, a toroidal continuously variable transmission comprises first and second toroidal units 10, 11 arranged in a transmission case 1 in series.

The rotation of the engine is transmitted to a cam flange 14 via a torque converter 4, oil pump 5 and forward/reverse change-over mechanism 9.

The rotation of the cam flange 14 is transmitted to an input disk 17 of the first toroidal unit 10 via cam rollers 15.

The input disk 17 is connected to an input disk 19 of the second toroidal unit 11 via a CVT shaft 3. These input disks 17, 19 are respectively connected to the CVT shaft 3 via ball splines 16, 21, and their rotation relative to the CVT shaft 3 is restricted while their axial displacement is permitted within a predetermined range.

The cam rollers 15 apply a thrust load depending on the rotation of the cam flange 14 with respect to the input disk 17, and exert a thrust load on the input disks 17, 19 towards corresponding output disks 18, 20. The output disks 18, 20 are engaged free to rotate on the outer circumference of the CVT shaft 3.

The input disk 17 and output disk 18 which form the first toroidal unit 10 comprise corresponding toroidal-shaped wall surfaces 17A, 18A, and a pair of power rollers 29 is gripped by the wall surfaces 17A, 18A due to the above-mentioned thrust load. The input disk 19 and output disk 20 of the second toroidal unit 11 likewise grip a pair of power rollers 30.

The operation of the power rollers 29 is limited by an upper link 34 and lower link 35 so that a drive mechanism, not shown, always drives them in opposite directions to each other.

Figure 2:
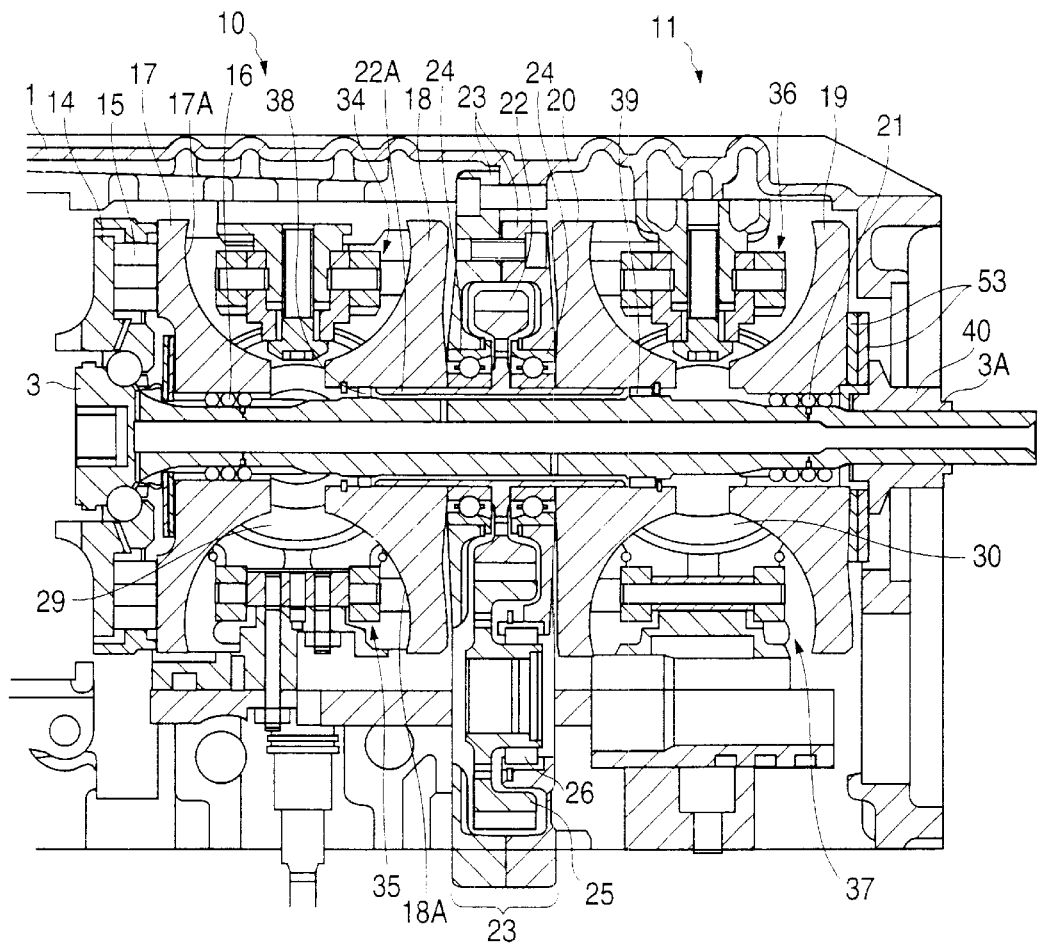
FIG. 2 is a longitudinal sectional view of the toroidal continuously variable transmission.

These directions correspond to the up/down directions in FIG. 2. The operation of the pair of power rollers 30 is also limited in the same way by an upper link 36 and lower link 37.

The rotation of the input disks 17, 19 is transmitted to the output disks 18, 20 via these power rollers 29, 30. The rotation of the output disks 18, 20 is transmitted to an output shaft, not shown, via an output gear 22, counter gear 25, counter shaft 27 and gear 28.

The output disks 18, 20 are respectively supported free to rotate on the outer circumference of the CVT shaft 3 via radial bearings 38, 39 shown in FIG. 2. The output disks 18, 20 are also spline-jointed on the outer circumference of a sleeve 22A which extends along the CVT shaft 3 from the output gear 22 to the right and left of FIG. 2.

A small clearance is provided between the inner circumference of the sleeve 22A and outer circumference of the CVT shaft 3, so the output gear 22 rotates independently of the CVT shaft 3 together with the output disks 18, 20. The output gear 22 is supported free to rotate via a bearing 24 in a gear housing 23 formed in one piece with the transmission case 1. The gear 25 is also supported free to rotate via a bearing 26 in the gear housing 23.

The contact point of the power roller 29 (30) with the input disk 17 (19), and the contact point of the power roller 29 (30) with the output disk 18 (20), vary according to the gyration angle of the power roller 29 (30), and the ratio of rotation speeds of the input disk 17 (19) and output disk 18 (20) is determined according to the distances of the contact points from the CVT shaft 3. This rotation speed ratio is the speed ratio of this toroidal CVT.

Next, the assembly of the toroidal continuously variable transmission will be described.

Referring to FIG. 2, the first and second toroidal units 10, 11 are assembled around the CVT shaft 3 in the casing 1. The output gear 22 and counter gear 25 are also fitted to the gear housing 23.

However, in the state shown in this figure, the torque converter 4 and forward/reverse change-over mechanism 9, counter shaft 27 and gear row 28 shown in FIG. 1 have not yet been incorporated.

Next, the assembly sequence for the continuously variable transmission required to reach this state will be described.

The output gear 22 is first assembled via the bearing 24 and the counter gear 25 is assembled via the bearing 26, these parts being supported in the gear housing 23.

After respectively spline jointing the output disk 18 and output disk 20 to the sleeve 22A of the output gear 22 attached to the gear housing 23, the gear housing 23 is fixed to the transmission case 1 by bolts. The radial bearings 38, 39 are then respectively fitted on the inner circumference of the output disks 18, 20.

Subsequently, the upper links 34, 36, lower links 35, 37 and power rollers 29, 30 of the first and second toroidal units 10, 11 are assembled in the transmission case 1 together with associated supporting parts and drive mechanisms.

Also, the input disk 17, balls of the ball spline 16, cam rollers 15 and cam flange 14 are first fitted on the CVT shaft 3. In this state, the CVT shaft 3 is passed through the output disk 18, sleeve 22A of the output gear 22 and output disk 20 in sequence from the left of FIG. 2.

Balls of the ball spline 21, input disk 19 and plate spring 53 are attached to the end of the CVT shaft 3 extending from the output disk 20.

Finally, a nut 40 is screwed on a male screw 3A formed at the tip of the CVT shaft 3, and the fitting of the CVT shaft 3 to the toroidal continuously variable transmission is completed by tightening the nut 40 in a direction which presses the input disk 19 via the plate spring 53.

Figure 3:
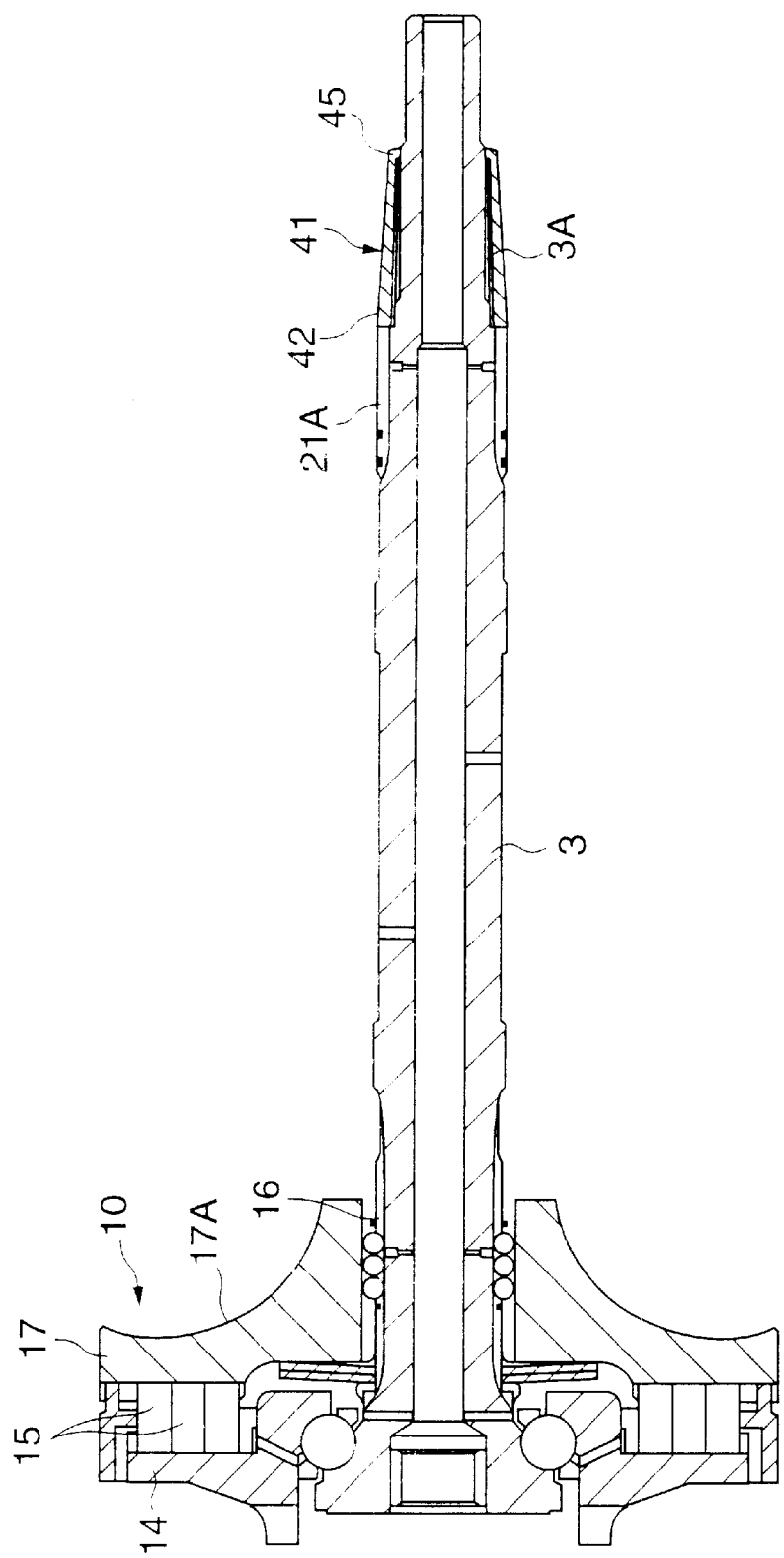
FIG. 3 is a longitudinal sectional view of a CVT shaft to which a jig according to this invention is fitted.

There is a step between the male screw 3A which has a small diameter and the ball spline 21 which has a large diameter and to the left of it on the CVT shaft 3. The step easily catches on the bearings 38, 39 and the inlet of the sleeve 22A when the CVT shaft 3 penetrates through the output disks 18, 20. There is also a risk that this step will damage the surrounding wall surfaces when the male screw 3A passes through these members. Conversely, if the step catches on these members, there is also a possibility that spline parts and the screw 3A will be damaged and the required machining precision will be lost. Therefore, according to this invention, a taper-shaped sheath 41 is fitted over the male screw 3A when the CVT shaft 3 is fitted to the toroidal continuously variable transmission, as shown in FIG. 3.

The sheath 41 comprises, for example, an oil-resistant resin material. The sheath 41 has a tapering, gradually decreasing diameter starting from the end 42 which has the same outer diameter as the spline part 21A of the ball spline 21. The male screw 3A passes through a hollow part 44 of the sheath 41, and a female screw 45A is formed on the inner circumference of an end 45 having the smaller outer diameter opposite to the end 42.

The sheath 41 is fitted on the outer circumference of the male screw 3A such that its end 42 becomes adjacent to the spline part 21A of the CVT shaft 3. In order to complete the fitting of the sheath 41, the female screw 45A at its other end 45 is screwed onto the male screw 3A by rotating the sheath 41, until the end 42 comes in contact with the spline part 21A.

As a result, the step between the spline part 21A and male screw 3A of the CVT shaft 3 is replaced by a smooth tapering surface, and the male screw 3A is covered by the sheath 41.

In this state, the CVT shaft 3 is passed through the output disks 18, 20 and sleeve 22A. Therefore, the step between the spline part 21A and male screw 3A does not catch on the radial bearings 38, 39 or the inlet of the sleeve 22A when the shaft is inserted, and the CVT shaft 3 can be passed smoothly through the output disks 18, 20 and sleeve 22A. Also, the screw 3A does not damage the inner walls of these members, and the male screw 3A and ball spline 21 are not damaged either.

With the CVT shaft 3 extending from the output disk 20, the sheath 41 is then removed from the male screw 3A, the ball of the ball spline, input disk 19 and plate spring 53 are fitted to the CVT shaft 3, and the nut 40 is tightened on the male screw 3A.

Figure 4:
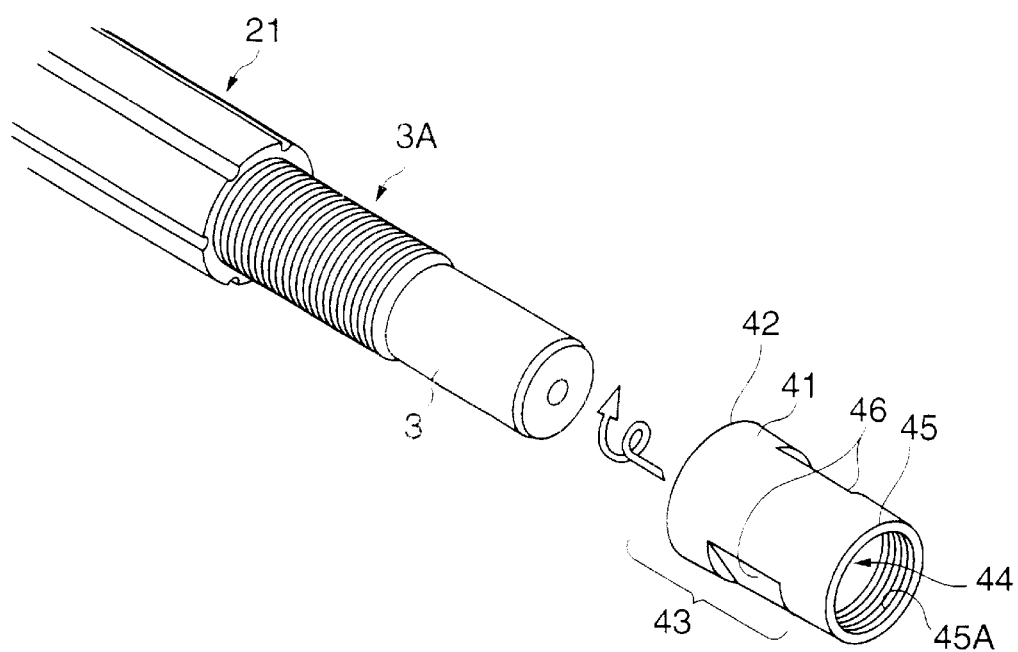
FIG. 4 is a split perspective view of the jig and the CVT shaft.

If two flat surfaces 46 shown in FIG. 4 are formed on the outer circumference of the sheath 41 as tool-engaging surfaces, these surfaces 46 can easily be gripped by a wrench or the like and the sheath 41 can easily be tightened, loosenend when the part 41 is fitted to or removed from the screw 3A.

The tool-engaging surfaces are not limited to two flat surfaces 46, and may have various shapes. For example, six plane surfaces may be formed in succession on the outer circumference of the sheath 41 in the manner of a nut.

The sheath 41 which comprises an oil-resistant resin is easy to machine, and it is light. Also, it can be used repeatedly which suppresses costs.

In the above-mentioned embodiment, the female screw 45A is formed in the outer engaging part 41, but the female screw 45A is not absolutely indispensable. If the inner circumferential diameter of the outer engaging part 41 is set so that can be brought into contact with the screw 3A under a pressure which does not damage the male screw 3A and which prevents the sheath 41 from falling out of the CVT shaft 3, the same desirable effects as those of the aforesaid embodiment may be realized by a simpler construction.

The contents of Tokugan Hei 10-175751, with a filing date of Jun. 23, 1998 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows.

What is claimed is:

1. A device for passing an axial member of a toroidal continuously variable transmission through disks which have been prefitted in a housing, wherein said axial member comprises a step between a large diameter part and a small diameter part, comprising:

a sheath member comprising a through hole through which said axial member passes, wherein a female thread is formed at least in a section of the inner surface of said through hole and wherein said female thread is screwable onto a male thread formed on an outer circumference of said small diameter part of the axial member, and an outer diameter of said sheath member gradually decreases from an outer diameter equal to that of said large diameter part.

2. A device according to claim 1, wherein said large diameter part comprises a plurality of grooves of a ball spline at an end adjacent to said small diameter part, wherein said sheath member is screwable onto said male thread until a side portion of said sheath member comes into contact with a side portion of said grooves of said ball spline.

3. A device according to claim 1, wherein said sheath member comprises two parallel flat surfaces on its outer circumference surface.

4. A device according to claim 1, wherein said sheath member is formed of an oil-resistant resin.

* * * * *